(12) United States Patent
Morgan et al.

(10) Patent No.: US 10,583,489 B2
(45) Date of Patent: Mar. 10, 2020

(54) METHOD OF PROVIDING COOLING STRUCTURE FOR A COMPONENT

(71) Applicant: GENERAL ELECTRIC COMPANY, Schenectady, NY (US)

(72) Inventors: Victor John Morgan, Simpsonville, SC (US); George Andrew Gergely, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 168 days.

(21) Appl. No.: 15/497,825

(22) Filed: Apr. 26, 2017

(65) Prior Publication Data

US 2018/0311740 A1 Nov. 1, 2018

(51) Int. Cl.
*B22F 5/04* (2006.01)
*B33Y 10/00* (2015.01)
(Continued)

(52) U.S. Cl.
CPC .............. *B22F 5/04* (2013.01); *B22D 21/005* (2013.01); *B22D 25/02* (2013.01); *B22F 3/1055* (2013.01); *B22F 3/24* (2013.01); *B22F 5/009* (2013.01); *B23K 15/0086* (2013.01); *B23K 26/342* (2015.10); *B23K 26/70* (2015.10); *B23P 15/04* (2013.01); *B33Y 10/00* (2014.12); *B33Y 80/00* (2014.12); *C22C 19/057* (2013.01); *C22C 19/07* (2013.01); *C22C 30/02* (2013.01); *C23C 26/00* (2013.01); *F01D 5/186* (2013.01); *F01D 5/188* (2013.01); *F01D 25/12* (2013.01);
(Continued)

(58) Field of Classification Search
CPC ......... Y10T 29/49341; Y10T 29/49343; F01D 5/18; F01D 5/186; F01D 5/187; F01D 5/188; F01D 5/189; F05D 2240/81
See application file for complete search history.

(56) References Cited

U.S. PATENT DOCUMENTS 6,575,702 B2  6/2003  Jackson et al.
6,887,033 B1  5/2005  Phillips et al.
(Continued)

FOREIGN PATENT DOCUMENTS

EP    1717416 A1   11/2006
EP    2131010 A1   12/2009
WO    WO-9318199 A1 *  9/1993  ............. C23C 10/48

OTHER PUBLICATIONS

International Search Report; dated Jul. 18, 2018.

*Primary Examiner* — Jason L Vaughan
(74) *Attorney, Agent, or Firm* — McNees Wallace & Nurick LLC

(57) ABSTRACT

A method of providing cooling structure for a component including forming a first cavity in the component and forming a first passageway in the first cavity in fluid communication with a second cavity positioned inside the component, the second cavity in fluid communication with a cooling air source. The method includes forming a unitary insert including a first surface, a second surface, the insert having an inlet formed in the first surface and an outlet formed in the second surface. A second passageway is in fluid communication with the inlet and the outlet. The method includes positioning the insert in the first cavity into fluid communication with the first passageway, the first surface facing the first cavity; and rigidly attaching the insert in the first cavity.

18 Claims, 6 Drawing Sheets

(51) Int. Cl.

| | | |
|---|---|---|
| *B33Y 80/00* | (2015.01) | |
| *B22F 3/105* | (2006.01) | |
| *B22F 3/24* | (2006.01) | |
| *B23K 15/00* | (2006.01) | |
| *B23K 26/342* | (2014.01) | |
| *B23K 26/70* | (2014.01) | |
| *B22F 5/00* | (2006.01) | |
| *C23C 26/00* | (2006.01) | |
| *C22C 19/07* | (2006.01) | |
| *C22C 19/05* | (2006.01) | |
| *C22C 30/02* | (2006.01) | |
| *B22D 21/00* | (2006.01) | |
| *B22D 25/02* | (2006.01) | |
| *F01D 25/12* | (2006.01) | |
| *B23P 15/04* | (2006.01) | |
| *F01D 5/18* | (2006.01) | |
| *F01D 9/02* | (2006.01) | |
| *B23K 101/00* | (2006.01) | |

(52) U.S. Cl.
CPC ..... *B22F 2003/242* (2013.01); *B22F 2998/10* (2013.01); *B23K 2101/001* (2018.08); *F01D 5/18* (2013.01); *F01D 9/02* (2013.01); *F05D 2220/32* (2013.01); *F05D 2230/21* (2013.01); *F05D 2230/211* (2013.01); *F05D 2230/22* (2013.01); *F05D 2230/31* (2013.01); *F05D 2230/60* (2013.01); *F05D 2230/80* (2013.01); *F05D 2230/90* (2013.01); *F05D 2240/81* (2013.01); *F05D 2300/175* (2013.01)

(56) References Cited

U.S. PATENT DOCUMENTS

| | | | |
|---|---|---|---|
| 8,047,001 B2 | 11/2011 | Beeck et al. | |
| 8,092,175 B2 | 1/2012 | Beeck et al. | |
| 8,172,504 B2 | 5/2012 | Flodman et al. | |
| 9,011,079 B2 * | 4/2015 | Coign | F01D 5/188 415/115 |
| 9,133,716 B2 | 9/2015 | Liang | |
| 9,845,691 B2 | 12/2017 | Allen et al. | |
| 2004/0001753 A1 * | 1/2004 | Tiemann | F01D 5/187 416/97 R |
| 2009/0081048 A1 * | 3/2009 | Beeck | F01D 5/18 416/97 R |
| 2012/0328451 A1 * | 12/2012 | Lomas | F01D 5/187 416/97 R |
| 2014/0023483 A1 | 1/2014 | Wiebe et al. | |
| 2014/0079539 A1 * | 3/2014 | Lehmann | F01D 5/188 415/175 |
| 2015/0047168 A1 | 2/2015 | James et al. | |
| 2015/0147164 A1 | 5/2015 | Cui et al. | |
| 2016/0089859 A1 | 5/2016 | Lacy et al. | |
| 2016/0177782 A1 * | 6/2016 | Hough | F01D 5/187 415/115 |
| 2016/0332371 A1 * | 11/2016 | Staroselsky | B22F 5/04 |
| 2018/0023399 A1 | 1/2018 | Merrill et al. | |

* cited by examiner

METHOD OF PROVIDING COOLING STRUCTURE FOR A COMPONENT

FIELD OF THE INVENTION

The present invention is directed to method of providing cooling structure for a component. More particularly, the present invention is directed to method of providing cooling structure for hot gas path components.

BACKGROUND OF THE INVENTION

Gas turbines are continuously being modified to provide increased efficiency and performance. These modifications include the ability to operate at higher temperatures and under harsher conditions, which often requires material modifications, and/or coatings, or cooling cores to protect components from such temperatures and conditions.

One modification to increase performance and efficiency involves forming hot gas path components or gas turbine components that are particularly subject to high temperatures, and thus require particular attention with regard to cooling, such as, but not limited to, airfoils, buckets (blades), nozzles (vanes), shrouds, combustor liners, and heat shields. Although a number of these components can utilize conventional cooling cores, such cores are expensive.

BRIEF DESCRIPTION OF THE INVENTION

In an exemplary embodiment, a method of providing cooling structure for a component, including forming a first cavity in the component and forming a first passageway in the first cavity in fluid communication with a second cavity positioned inside the component, the second cavity in fluid communication with a cooling air source. The method further includes forming a unitary insert including a first surface, a second surface, the insert having an inlet formed in the first surface and an outlet formed in the second surface, and a second passageway in fluid communication with the inlet and the outlet. The method includes positioning the insert in the first cavity into fluid communication with the first passageway, the first surface facing the first cavity; and rigidly attaching the insert in the first cavity.

In another exemplary embodiment, a method of providing cooling structure for a hot gas path component, including forming a first cavity in a gas path surface of the component, and forming a first passageway in the first cavity in fluid communication with a second cavity positioned inside the component, the second cavity in fluid communication with a cooling air source. The method further includes forming a unitary insert including a first surface and a second surface, the insert having an inlet formed in the first surface and an outlet formed in the second surface. A second passageway is provided in fluid communication with the inlet and the outlet. The method further includes positioning the insert in the first cavity into fluid communication with the first passageway, the first surface facing the first cavity, and rigidly attaching the insert in the first cavity.

In another exemplary embodiment, a method of providing cooling structure for a hot gas path component, including forming a first cavity in a gas path surface of the component, and forming a first passageway in the first cavity in fluid communication with a second cavity positioned inside the component, the second cavity in fluid communication with a cooling air source. The method further includes forming a unitary insert by an additive manufacturing process including a first surface and a second surface, the insert having an inlet formed in the first surface and an outlet formed in the second surface, and a second passageway in fluid communication with the inlet and the outlet. The method further including positioning the insert in the first cavity into fluid communication with the first passageway, the first surface facing the first cavity and rigidly attaching the insert in the first cavity.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an insert or "mini-core" for providing cooling of at least a portion of a component, such as a hot gas path surface of a hot gas path component or gas turbine component. Embodiments of the present disclosure, in comparison to not utilizing one or more features disclosed herein, decrease costs, increase process efficiency, increase cooling flow, increase operating temperature limits, increase operating lifetime, or a combination thereof.

Figure 1:
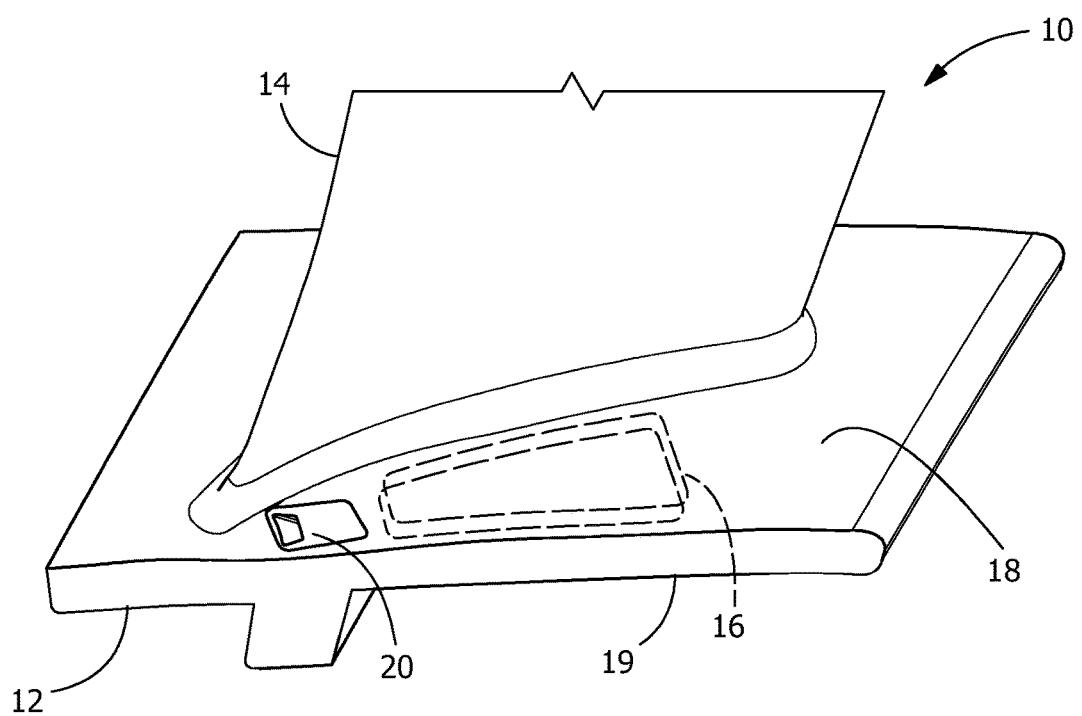
FIG. 1 is a partial perspective view of an exemplary gas turbine component including an exemplary insert of the present disclosure.

An exemplary hot gas component 10, such as a shroud 12 and nozzle 14 is shown in FIG. 1. Shroud 12 includes an internal cavity 16 positioned between a gas path surface 18 and an opposed surface 19. During operation of the gas turbine (not shown), high temperature gas flows along gas path surface 18 Cavity 16 is in fluid communication with a cooling air source (not shown) for providing cooling to the component. As further shown in FIG. 1, an insert 20 is inserted in a cavity formed in shroud 12 for providing cooling thereto. As will be discussed in further detail below, the insert helps provide cooling to portions of hot gas path components in a cost-effective manner, helping to extend the service life of such components subjected to "hot spots" during operation of the gas turbine. In one embodiment, such an insert may be the only reasonably feasible way (absent conventional extremely expensive methods) to provide cooling to a desired portion of a component.

Figure 2:
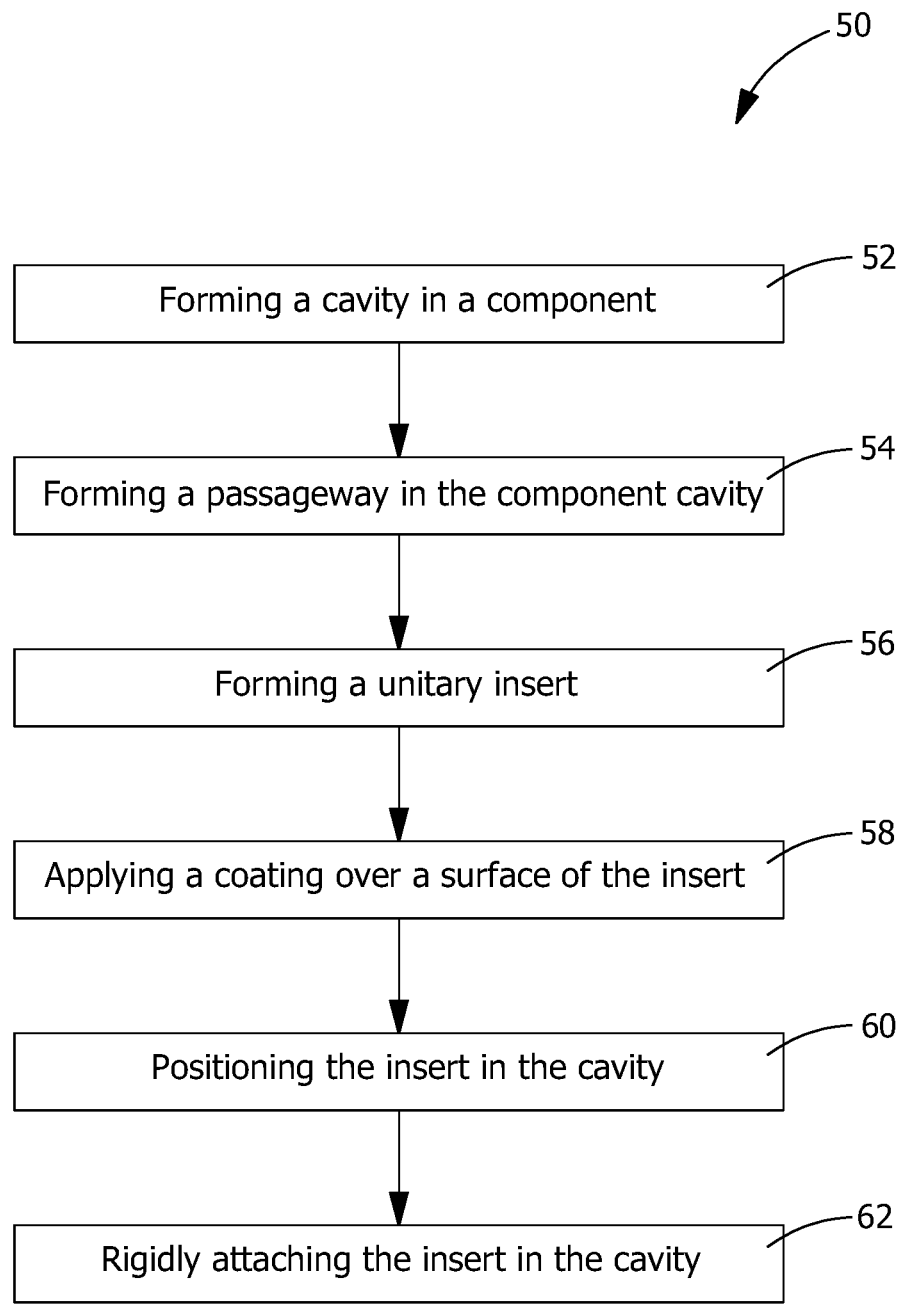
FIG. 2 is a flow chart of the method of providing cooling for an exemplary gas turbine component, according to an embodiment of the present disclosure.
Figure 3:
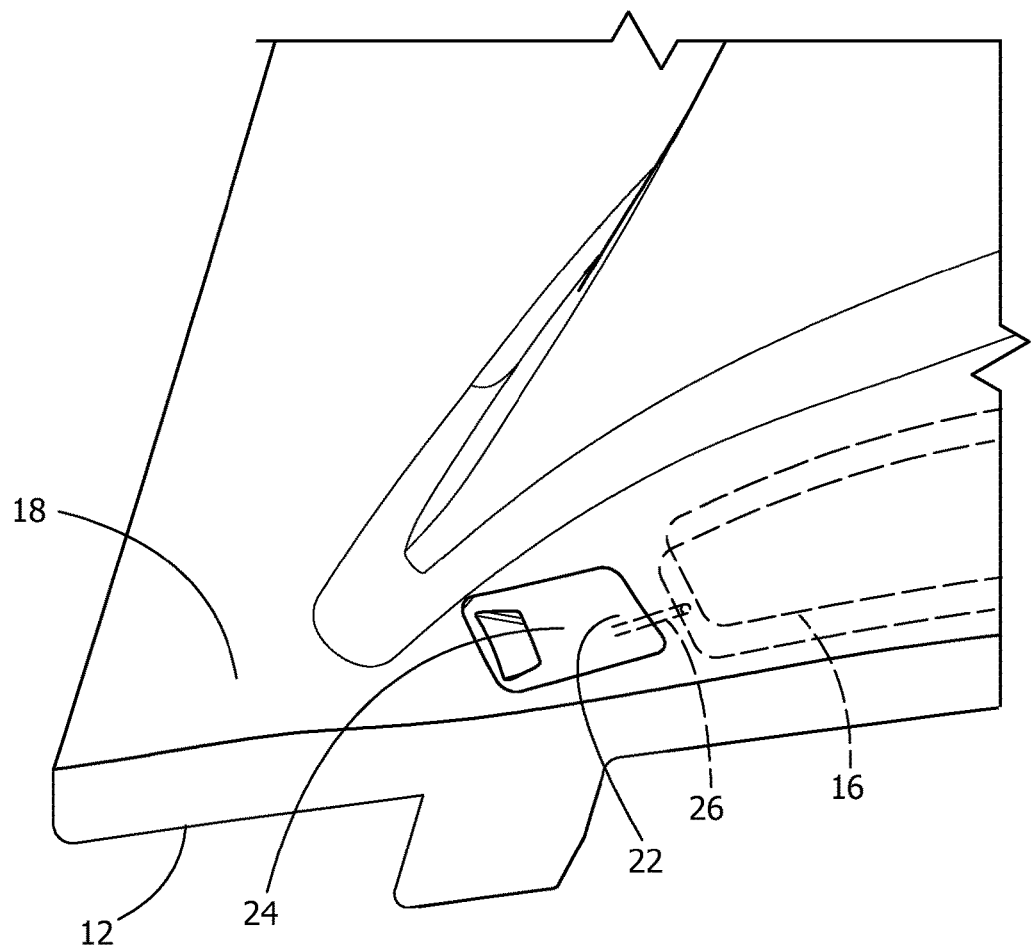
FIG. 3 is an enlarged view of the gas turbine component of FIG. 1, with the insert removed, according to an embodiment of the present disclosure.
Figure 4:
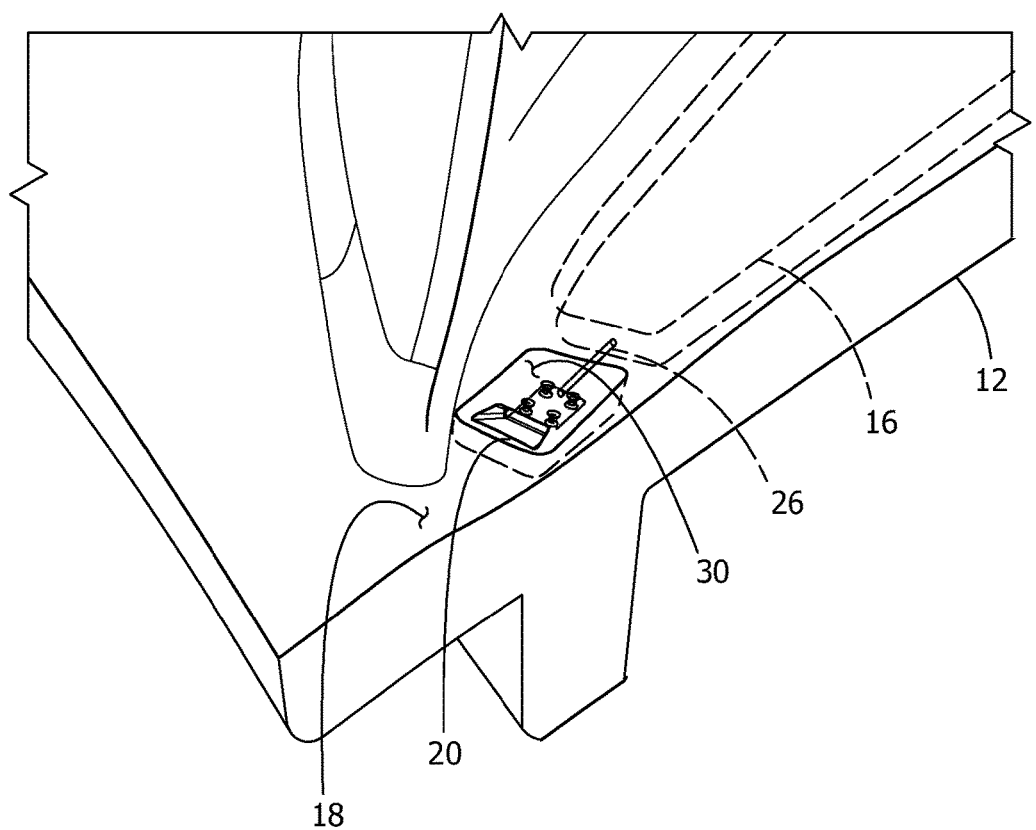
FIG. 4 is an enlarged view of the gas turbine component of FIG. 3, with the insert installed, according to an embodiment of the present disclosure.

A method 50 of providing cooling for a component 10, such as shroud 12 (FIG. 1) is shown in FIG. 2, supplemented by FIGS. 3-6 for purposes of more easily understanding the disclosure. Method 50 includes forming a cavity 22 in component 10 as shown in step 52 of method 50, with cavity 22 being formed in gas path surface 18 and having a surface 24 as shown in FIG. 3. Method 50 includes forming a passageway 26 in component cavity 22 as shown in step 54, with passageway 26 formed in surface 24 in fluid communication with cavity 16 as shown in FIG. 3. Method 50 includes forming a unitary insert 20 as shown in step 56, with insert 20 shown in FIGS. 5, 6 to be discussed in additional detail below. Optionally, method 50 includes applying a coating, such as a thermal barrier coating and bond coating over a surface of insert 20 as shown in step 58, which surface corresponding to gas path surface 18 of shroud 12 surrounding insert 20 as shown in FIG. 4. Method 50 includes positioning insert 20 in cavity 22 as shown in step 60. Method 50 includes rigidly attaching insert 20 in cavity 22 as shown in step 62 of FIG. 2. Rigidly attaching includes fully or at least partially welding, sintering or other suitable method for securing insert 20 in cavity 22. In one embodiment, step 58 can be performed prior to or subsequent to either of steps 60, 62.

Figure 5:
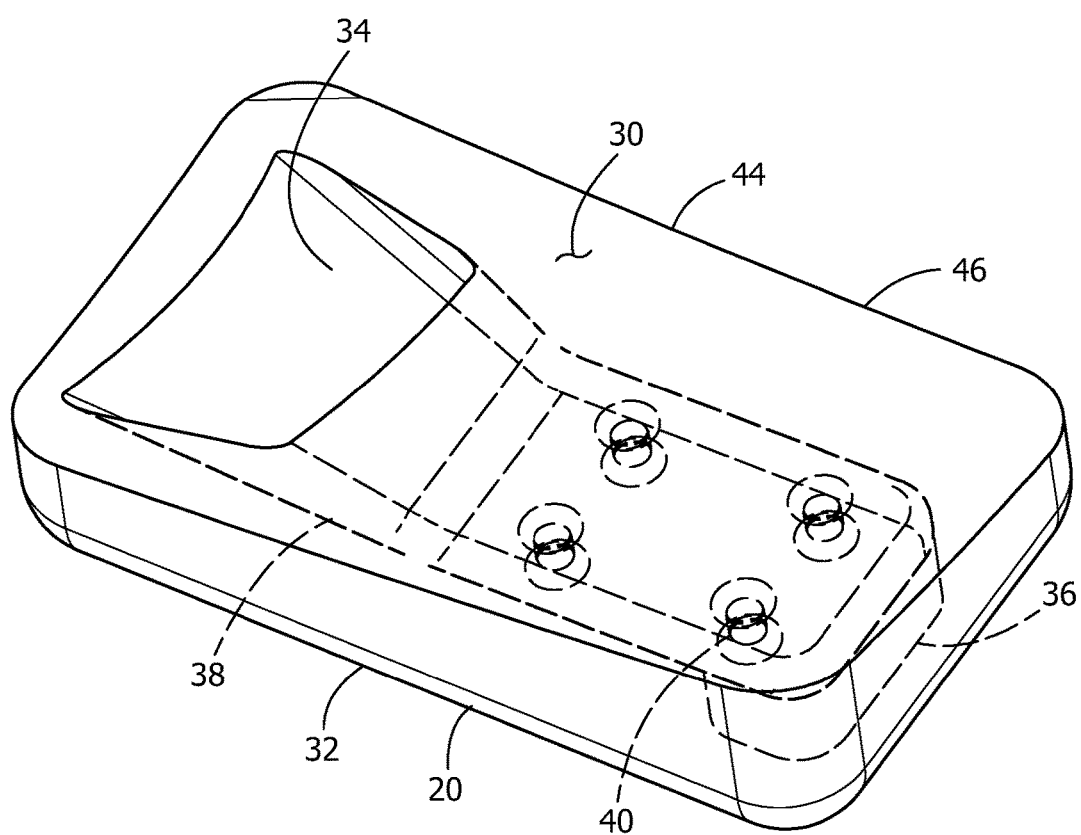
FIG. 5 is an enlarged, upper perspective view of an insert, according to an embodiment of the present disclosure.
Figure 6:
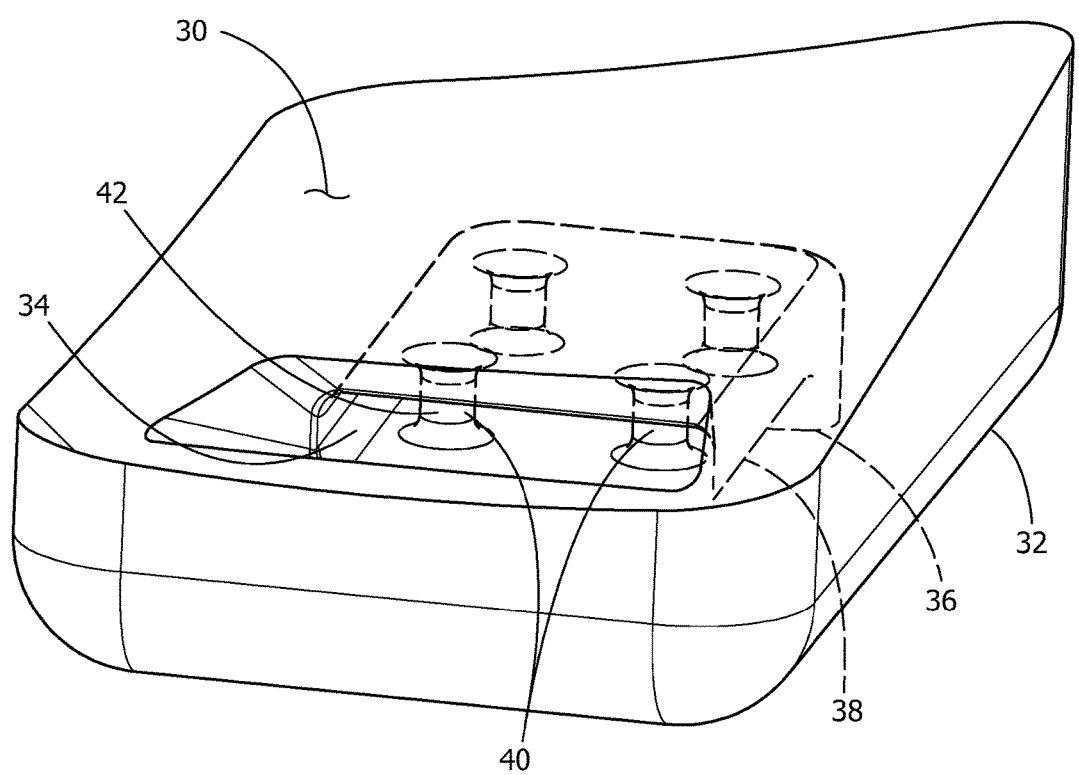
FIG. 6 is an enlarged, upper perspective view of the insert of FIG. 5 rotated 90 degrees about a vertical axis, according to an embodiment of the present disclosure.

As shown in FIGS. 5-6, insert 20 is now discussed. Insert 20 includes a surface 30 and an opposed surface 32. While insert 20 is shown in FIGS. 5-6 as having a generally rectangular shape, it is to be understood the insert can have other shapes suitable for the application. In one embodiment, insert 20 is of unitary or one piece construction. Surface 30 corresponds to and faces the same direction as gas path surface 18 (FIG. 4) and is surrounded by gas path surface 18 when insert 20 is positioned in cavity 22 (FIG. 3). Surface 32 of insert 20 corresponds to and faces surface 24 of cavity 22 of component 10 when insert 20 is positioned in cavity 22 (FIG. 3). An outlet 34 is formed in surface 30 and an inlet 36 is formed in surface 32. A passageway 38 extends in fluid communication between outlet 34 and inlet 36. Inlet 36 is in fluid communication with passageway 26 (FIG. 3) such that when insert 20 is positioned in cavity 22, inlet 36 is in fluid communication with cavity 16 (FIGS. 3, 4) and therefore, outlet 34 is also in fluid communication with cavity 16. As a result, cooling air from a cooling air source (not shown) can be conveyed from cavity 16, through passageway 26, and then through outlet 34 for providing cooling to the component.

As further shown in FIGS. 5-6, passageway 38 includes one or more flow modification features 40. Flow modification features 40 can modify the flow of cooling air through passageway 38 to optimize the amount of cooling of the component. As further shown in FIGS. 5-6, flow modification features 40 include protrusions 42, such as posts extending at least partially into passageway 38, which protrusions 42 increasing the surface area for optimizing component cooling. In one embodiment, the flow modification features can include protrusions, indentions and/or a combination thereof for optimizing component cooling. It is appreciated that the geometry of insert 20, outlet 34, inlet 36, passageway 38 and flow modification features 40 can vary, depending upon cooling requirements, structural requirements, or other reasons.

As shown in FIG. 5, insert 20 is of unitary or one piece construction. In one embodiment, the surfaces of passageway 38 and flow modification features 40 are within a line of sight from at least one of outlet 34 and inlet 36. In one embodiment, at least a portion of a surface of passageway 38 and flow modification features 40 are not within a line of sight from at least one of outlet 34 and inlet 36.

In one embodiment, insert 20 is constructed of multiple pieces, such as insert portions 44, 46 that may be joined to each other to form a unitary or one piece construction, or may be at least partially individually rigidly attached in insert 22 (FIG. 3). The geometry of insert portions 44, 46 may be such that formation of corresponding segments or portions of surfaces of passageway 38 and flow modification features 40 are within a line of sight.

The term "line of sight" is intended to mean that any portion or segment of the passageway surface and any portion or segment of the flow modification features of the insert (or insert portion) is accessible by a straight line directed from exterior of the insert (or insert portion).

For reasons including when the surfaces of passageway 38 and flow modification features 40 are not within a line of sight from at least one of outlet 34 and inlet 36 (FIG. 5), the geometry of such surfaces are sufficiently complex, or for other reasons, insert 20 may be formed by an additive manufacturing process. Additive manufacturing processes known to those of ordinary skill in the art include, but are not limited to, direct metal laser melting, direct metal laser sintering, selective laser sintering, direct metal laser sintering, laser engineered net shaping, selective laser sintering, selective laser melting, electron beam welding, used deposition modeling or a combination thereof.

Articles that operate at elevated temperatures include, but are not limited to, gas turbine components, such as buckets, nozzles, airfoils, or any other components requiring cooling holes. In a further embodiment, the article is either a new make or an existing article, such as, but not limited to, an article for repair or upgrade.

Suitable compositions for the articles and/or inserts include, but are not limited to, an alloy, such as a gamma prime superalloy or a stainless steel. In one embodiment, the gamma prime superalloy includes, for example, a composition, by weight, of about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, about 0.05% carbon, about 0.004% boron, and a balance nickel and incidental impurities. In another example, the gamma prime superalloy includes a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, about 0.05% carbon, about 0.004% boron, about 0.01% yttrium, and a balance nickel and incidental impurities. In another example, the gamma prime superalloy includes a composition, by weight, of between about 8.0% and about 8.7% Cr, between about 9% and about 10% Co, between about 5.25% and about 5.75% Al, up to about 0.9% Ti (for example, between about 0.6% and about 0.9%), between about 9.3% and about 9.7% W, up to about 0.6% Mo (for example, between about 0.4% and about 0.6%), between about 2.8% and about 3.3% Ta, between about 1.3% and about 1.7% Hf, up to about 0.1% C (for example, between about 0.07% and about 0.1%), up to about 0.02% Zr (for example, between about 0.005% and about 0.02%), up to about 0.02% B (for example, between about 0.01% and about 0.02%), up to about 0.2% Fe, up to about 0.12% Si, up to about 0.1% Mn, up to about 0.1% Cu, up to about 0.01% P, up to about 0.004% S, up to about 0.1% Nb, and a balance nickel and incidental impurities.

Suitable compositions for articles and/or inserts formed by the additive method 100 include, but are not limited to, an alloy, such as a stainless steel, a superalloy, or a cobalt based alloy. In one embodiment, the structure 251 is attached to a cooled region of the substrate 401, which reduces the temperatures the structure 251 is exposed to. In another embodiment, the cobalt based alloy includes, for example, 70Co-27Cr-3Mo. In a further embodiment the superalloy includes, but is not limited to, an iron-based superalloy, a nickel-based superalloy, or a combination thereof.

Suitable iron-based superalloys include, but are not limited to, a composition, by weight, of between about 50% and about 55% nickel+cobalt, between about 17% and about 21% chromium, between about 4.75% and about 5.50% columbium+tantalum, about 0.08% carbon, about 0.35% manganese, about 0.35% silicon, about 0.015% phosphorus, about 0.015% sulfur, about 1.0% cobalt, between about 0.35% and about 0.80% aluminum, between about 2.80% and about 3.30% molybdenum, between about 0.65% and about 1.15% titanium, between about 0.001% and about 0.006% boron, 0.15% copper, and a balance iron and incidental impurities.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of providing cooling structure for a shroud, comprising:
    forming a first cavity in a gas path surface of the shroud, the first cavity proximate to a trailing edge of the shroud;
    forming a first passageway in the first cavity in fluid communication with a second cavity positioned inside the shroud, the second cavity in fluid communication with a cooling air source;
    forming a unitary insert comprising:
        a first surface defining an inlet;
        a second surface defining an outlet; and
        a second passageway in fluid communication with the inlet and the outlet; and
    positioning the insert in the first cavity into fluid communication with the first passageway, the first surface facing the first cavity and the second surface facing the gas path surface; and
    rigidly attaching the insert in the first cavity.

2. The method of claim 1, wherein the insert is formed by an additive manufacturing process.

3. The method of claim 2, wherein the additive manufacturing process is selected from the group comprising direct metal laser melting, direct metal laser sintering, selective laser sintering, direct metal laser sintering, laser engineered net shaping, selective laser sintering, selective laser melting, electron beam welding, used deposition modeling or a combination thereof.

4. The method of claim 1, wherein the insert is formed by a casting method.

5. The method of claim 1, wherein the second passageway includes a flow modification feature.

6. The method of claim 1, further including an additional step of applying a coating over the second surface of the insert.

7. The method of claim 6, wherein applying a coating over the second surface of the insert includes applying a bond coat and a thermal barrier coating over the second surface of the insert.

8. The method of claim 1, wherein at least a portion of a surface of the second passageway is not within a line of sight of the inlet and the outlet prior to positioning the insert in the first cavity.

9. A method of providing a cooling structure for a hot gas path shroud, comprising:
    forming a first cavity in a gas path surface of the shroud, the first cavity proximate to a trailing edge of the shroud;
    forming a first passageway in the first cavity in fluid communication with a second cavity positioned inside the shroud, the second cavity in fluid communication with a cooling air source;
    forming a unitary insert by an additive manufacturing process comprising:
        a first surface defining an inlet;
        a second surface defining an outlet;
        and
        a second passageway in fluid communication with the inlet and the outlet; and
    positioning the insert in the first cavity into fluid communication with the first passageway, the first surface facing the first cavity and the second surface facing the gas path surface; and
    rigidly attaching the insert in the first cavity.

10. The method of claim 9, wherein the additive manufacturing process is selected from the group comprising direct metal laser melting, direct metal laser sintering, selective laser sintering, direct metal laser sintering, laser engineered net shaping, selective laser sintering, selective laser melting, electron beam welding, used deposition modeling or a combination thereof.

11. The method of claim 9, wherein the second passageway includes a flow modification feature extending at least partially into the second passageway.

12. The method of claim 9, further including an additional step of applying a coating over the second surface of the insert.

13. The method of claim 9, wherein at least a portion of a surface of the second passageway is not within a line of sight of the inlet and the outlet prior to positioning the insert in the first cavity.

14. A method of providing cooling structure for a hot gas path shroud, comprising:
    forming a first cavity in a gas path surface of the shroud, the first cavity proximate to a trailing edge of the shroud;
    forming a first passageway in the first cavity in fluid communication with a second cavity positioned inside the shroud, the second cavity in fluid communication with a cooling air source;
    forming a unitary insert by an additive manufacturing process comprising:
        a first surface defining an inlet;
        a second surface defining an outlet;
        and
        a second passageway in fluid communication with the inlet and the outlet, the second passageway including a flow modification feature; and
    positioning the insert in the first cavity into fluid communication with the first passageway, the first surface facing the first cavity and the second surface facing the gas path surface; and
    rigidly attaching the insert in the first cavity.

15. The method of claim 14, wherein the additive manufacturing process is selected from the group comprising direct metal laser melting, direct metal laser sintering, selective laser sintering, direct metal laser sintering, laser engineered net shaping, selective laser sintering, selective laser melting, electron beam welding, used deposition modeling or a combination thereof.

16. The method of claim 14, further including an additional step of applying a coating over the second surface of the insert.

17. The method of claim 16, wherein applying a coating over the second surface of the insert includes applying a bond coat and a thermal barrier coating over the second surface of the insert.

18. The method of claim 15, wherein at least a portion of a surface of the second passageway is not within a line of sight of the inlet and the outlet prior to positioning the insert in the first cavity.

* * * * *